United States Patent [19]

Birnbach et al.

[11] 4,194,691
[45] Mar. 25, 1980

[54] AUTOMATIC CONTROL OF THE MOISTURE CONTENT OF THE SOIL

[76] Inventors: Lawrence H. Birnbach, 7 Jones St., New York, N.Y. 10014; Curtis A. Birnbach, 254 Seaman Ave., New York, N.Y. 10034

[21] Appl. No.: 964,706

[22] Filed: Nov. 29, 1978

Related U.S. Application Data

[63] Continuation-in-part of Ser. No. 740,886, Nov. 11, 1976, abandoned.

[51] Int. Cl.² .............................................. B05B 12/04
[52] U.S. Cl. .................................... 239/63; 324/65 P
[58] Field of Search .................. 239/63, 64, DIG. 15; 47/80; 324/65 R, 65 P; 137/78; 251/129; 307/118

[56] References Cited

U.S. PATENT DOCUMENTS

| | | | |
|---|---|---|---|
| 3,599,867 | 8/1971 | Griswold et al. | 137/78 |
| 3,626,286 | 12/1971 | Rauchwerger | 239/63 X |
| 3,956,772 | 5/1976 | Cox | 251/129 X |
| 3,968,428 | 7/1976 | Numoto | 324/65 P |
| 4,015,616 | 4/1977 | Hanff | 239/63 X |

Primary Examiner—Robert B. Reeves
Assistant Examiner—Michael J. Forman

[57] ABSTRACT

The moisture content of the soil in each of a number of areas is maintained between predetermined wet and dry thresholds by a control having circuits operative in response to detected thresholds through contacts inserted in the soil to effect the opening and closing of a valve in the conduit by which water is delivered to that area. Typically a number of conduits are connected directly or through junctions to a common water supply and where that supply is pump controlled, the control for each conduit includes circuitry that enables a switch in the pump motor circuit to be closed whenever the valve operated by that control is open.

19 Claims, 10 Drawing Figures

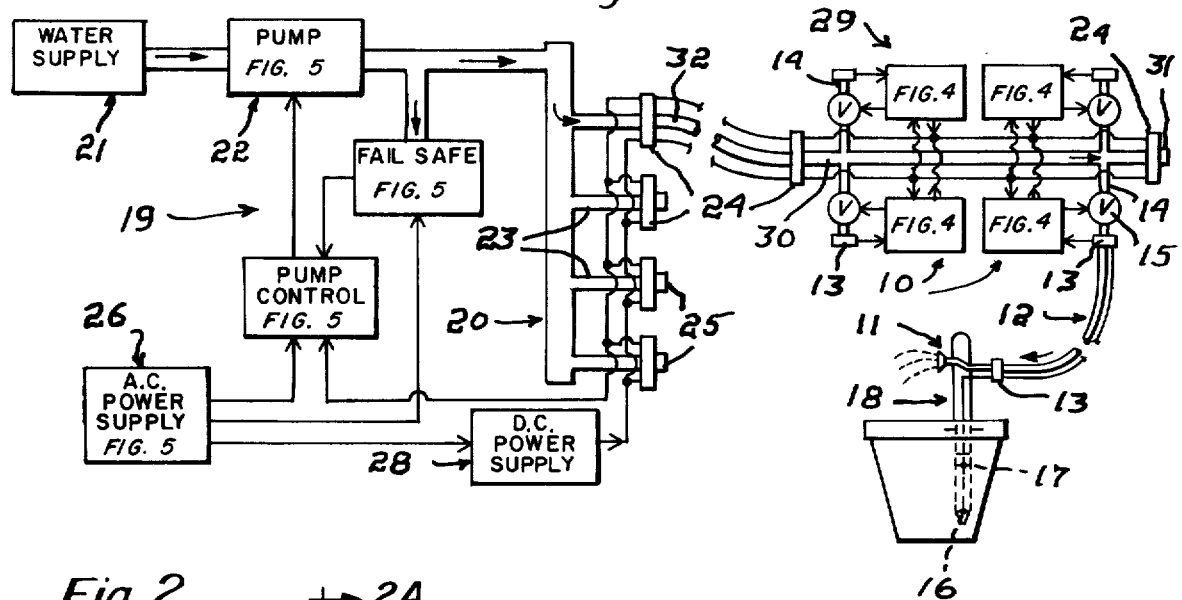
Fig. 1
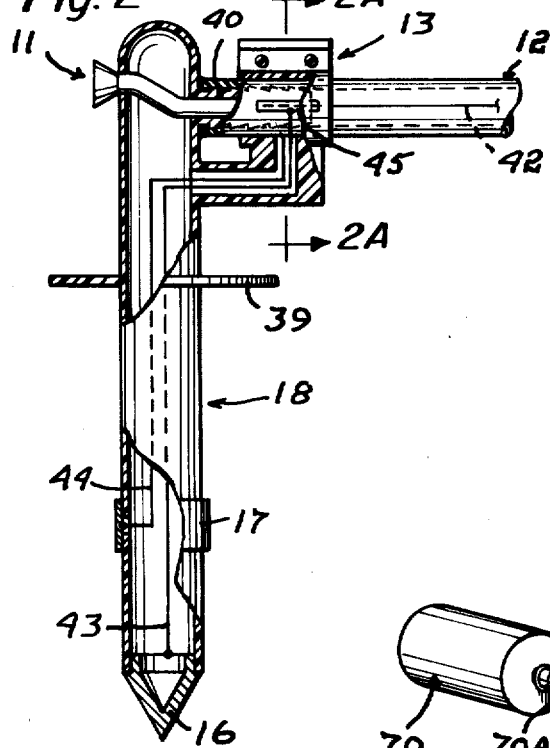
Fig. 2
Fig. 2A
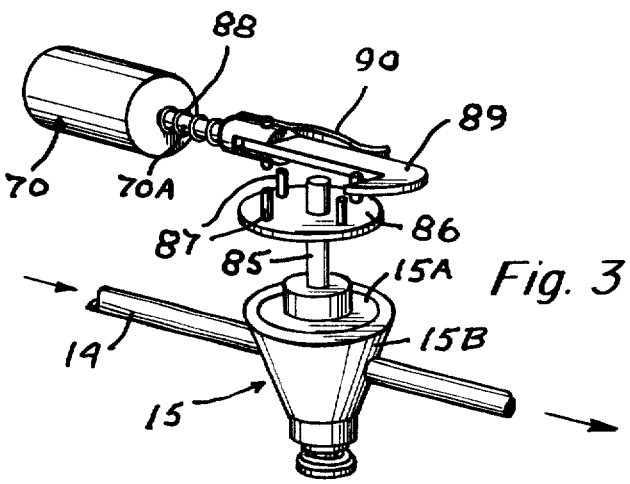
Fig. 3

AUTOMATIC CONTROL OF THE MOISTURE CONTENT OF THE SOIL

The present application is a Continuation-in-part of Ser. No. 740,886, filed Nov. 11, 1976 now abandoned.

BACKGROUND REFERENCES

U.S. Pat. No. 2,743,552
U.S. Pat. No. 3,438,383
U.S. Pat. No. 3,512,712
U.S. Pat. No. 3,551,743
U.S. Pat. No. 3,758,987

BACKGROUND OF THE INVENTION

While everyone is familiar with the fact that the proper development of a plant depends, to a large extent, on the moisture content of the soil, it is less widely recognized that the moisture requirements of plants vary with kind, location, and size and that, additionally, soils differ in their capacity to retain moisture.

While plants may be watered manually and devices are available to indicate the moisture content of the soil, the problem of ensuring that the moisture content is adequate for plants becomes difficult as the number of areas to be irrigated increases and where the plants have different watering requirements. A manifold system providing for the delivery of water to each area is convenient, whether turned on and off manually or by a timer but it does not ensure that the moisture content of the soil in the several areas is maintained within predetermined limits and it cannot maintain the moisture content of the soil in different areas within different high and low moisture content levels.

As far as we are aware, no system is available that enables water to be delivered to any one of a series of areas, independently of any other area of that series, with the delivery of water thereto initiated whenever the moisture content of that one area drops to a predetermined low level or threshold and is terminated automatically when a predetermined high level or threshold is attained.

THE PRESENT INVENTION

The general objective of the present invention is to ensure that the moisture content of the soil in one or more areas is maintained between predetermined wet and dry thresholds thus providing optimum conditions for the plant life growing therein while conserving water.

In accordance with the invention, this objective is attained, in the case of an existing system having a plurality of water conduits, each leading to a particular one of the areas, by providing each such conduit with an electrically operated valve and a control for each valve operable to open or close it in response to dry and wet threshold detected by that control. Typically, a number of conduits are connected to a manifold and the valves and the controls therefor are closely associated therewith.

In more detail, each control has a pair of contacts to be inserted in the soil and desirably, but not necessarily, combined in a probe. One of the input leads of the control includes a string of resistors and a capacitor and leads of substantial length connect the soil-entering contacts to that string across its capacitor. The string includes first and second adjustable resistors, the first establishing a dry threshold and providing an input to a first circuit and the second establishing a wet threshold and providing an input to a second circuit. Each circuit has a Schmitt trigger and the control has a third circuit which includes the valve operating means and is controlled by the output of the triggers, that of the first circuit trigger to effect valve opening and that of the second circuit trigger to effect valve closing.

Where a system must have a pump controlled water supply, the invention provides an electrically operated switch in the pump motor circuit and each control includes circuitry including the switch therein and means connected to and controlled by the first circuit to effect the closing of that switch at the threshold monitored thereby and means connected to the third circuit and controlled by the output of the second circuit trigger to effect the opening of the switch when the valve in the associated conduit is closed.

Another objective of the invention is to provide for fail-safe control of systems including a water pump, an objective attained by providing the motor circuit with a relay in control of three leads and itself controlled by a switch that opens if the pressure in the system is below a predetermined pressure and a parallel switch that opens on a time-delay basis, two of the leads normally open with one including the pump motor and the other, a holding lead for the relay. The third lead is normally closed and includes one or more signals warning of such malfunctions as a ruptured hose or a valve stuck in its open position, the system then shutting down until manually restarted with the cause of the malfunction corrected.

Yet another objective of the invention is to provide apparatus that facilitates installation and use, an objective attained by providing probes, each incorporating the two contacts for a control and a spray head to which a conduit is connected, each conduit carrying leads connected to probe contact leads and themselves connected to the control across the capacitor in the resistor string. Preferably the conduits are hoses and the leads are printed thereon and then covered with insulation.

Another objective of the invention is to provide apparatus in which the conduits and the electrical system are equally well adapted for use whether the number of areas to be irrigated is large or small. In accordance with the invention, this objective is attained with a central station at which the water supply and the power source are located and with a plurality of junctions, each junction having a manifold to which a plurality of valve-controlled conduits is connected. The conduits connecting the junctions to the central station or to each other carry two pair of leads, one pair the input power for the controls and the other pair, the output therefrom to the switch in control of the pump motor. Preferably such conduits are hoses and both pairs of leads are printed thereon and then covered with insulation. Connectors enable hoses and circuit sections to be easily and securely coupled.

Other objectives of the invention and other of its novel features and advantages in addition to the provision of noise immunity will be apparent from the description of the preferred embodiment of the invention and its appended claims.

BRIEF DESCRIPTION OF THE DRAWINGS

In the accompanying drawings, a preferred embodiment of the invention is illustrated with FIG. 1 a schematic view of an installation;

FIG. 2 is a side elevation of one of the probes;

FIG. 2A is a partly sectioned view, on an increase in scale, taken approximately along the indicated line 2A—2A of FIG. 2;

FIG. 3 is a view of one of the valves and the solenoid operated means in control thereof;

THE PREFERRED EMBODIMENTS OF THE INVENTION

Figure 4:
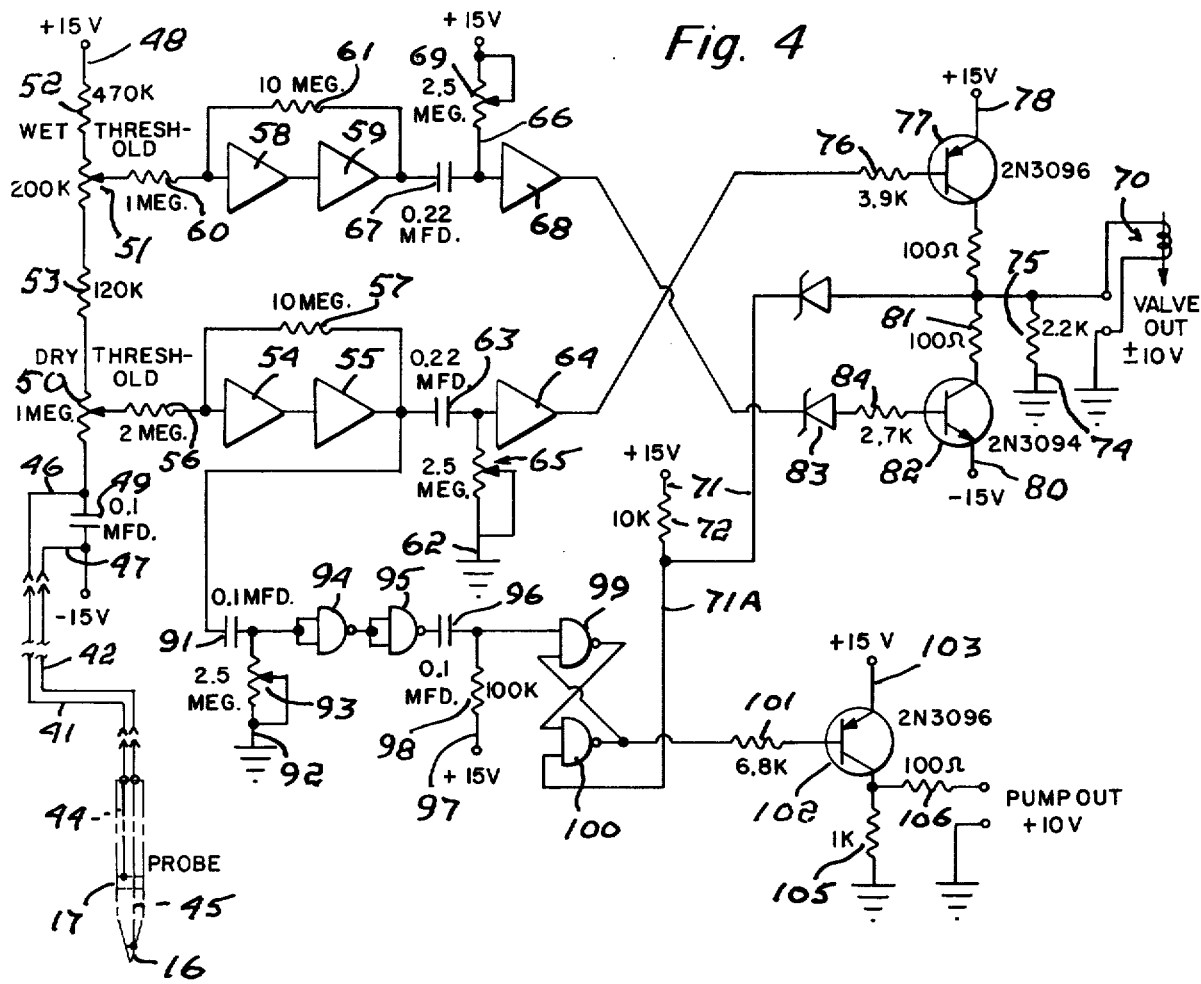
FIG. 4 is a schematic view of the circuitry of a control excluding part of the pump motor control circuit.

Before detailing controls in accordance with the invention which are generally indicated at 10 and by each of which wet and dry thresholds in the soil in a particular area are detected and by which the delivery of water thereto is controlled to maintain the moisture content of the soil in that area between said thresholds, reference is first made to FIG. 1 where an installation is somewhat schematically shown where the number of areas may be large. Each area has a water distributor, shown as a spray device, generally indicated at 11, one being shown in FIG. 1 with the conduit connected thereto generally indicated at 12 and secured by connectors 13 to a spray device 11 and to a water outlet 14 provided with an electrically operated valve 15. Each valve 15 is operated by the associated control 10 and each control 10 has contacts 16 and 17 to be inserted in the soil and connected thereto by leads, later to be detailed, of substantial length. The contacts 16 and 17 and a spray device 11 are incorporated in a probe, generally indicated at 18.

A central station 19 has a manifold 20 to which water is delivered from a source 21 by a pump 22 and the manifold 20 has a series of outlets 23 each provided with a connector, generally indicated at 24 and with an outlet 23 not in use closed by a cap 25. The station 19 is also shown as having an alternating current circuit 26 for the control for the pump motor 27, see FIG. 5, and for the transformer 28 providing the direct current, say 15 V, required for the operation of the valves 15 and the controls 10, the functions of each control being to open the associated valve 15 and also start the water pump 22 when a dry threshold is detected and to close that valve and release its control of the pump motor 28 to permit the pump to stop unless the wet threshold in any other area has not been reached thus requiring its continued operation.

In a typical installation, there is or may be such a large number of areas to be irrigated that the direct connection of all the conduits 12 to one manifold would result in an objectionable maize. As a consequence, junctions generally indicated at 29 are provided with but one such junction shown in FIG. 1.

Each junction 29 has a manifold 30 provided with a connector 24 at each end and with one end shown as closed by a cap 31. The manifold 30 has a convenient number of outlets 14. Each outlet 14 is provided with a connector 13 and a valve 15 and the manifold 20 may, accordingly, thus have a relatively small number of outlets 23 directly connected thereto. A conduit 32, desirably a length of hose, is secured to the other end of each manifold 30 and an outlet 23 by means of connectors 24. Other junctions 29 may be similarly connected to other outlets 23 or another such junction 29 may be similarly connected to the manifold of a junction 29 when its capped end is opened.

In the disclosed embodiment of the invention, the connectors 24 also serve to connect the leads that provide the direct current required for the operation of the controls 10 and the valves 14, to bus bars (not shown) at a junction 29. The connectors 24 also serve to connect the leads for the signals from each control 10 to the pump motor control 28 via bus bars (not shown) at the central station 19. In the disclosed embodiment, the two 15 V leads 33 and 34 and the two leads 35 and 36 for the motor control signals are printed on the hose 32 and covered with insulation, see FIGS. 6 and 7.

Figure 6:
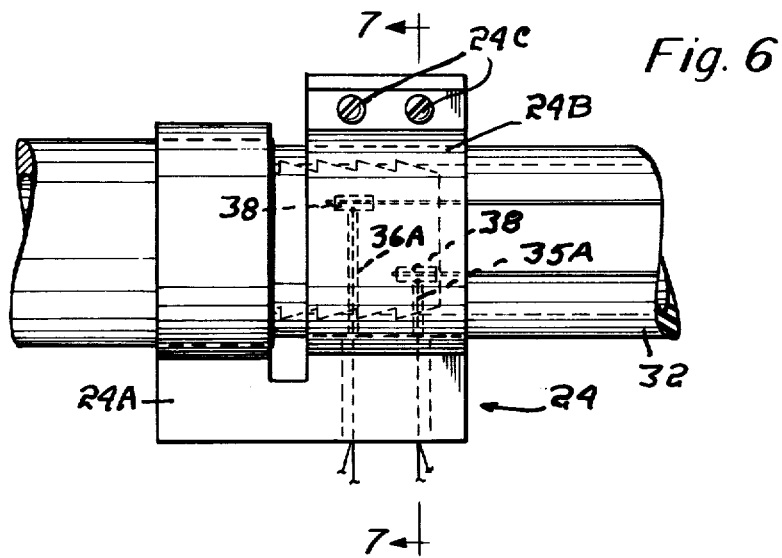
FIG. 6 is a side view of a connector for use in joining a hose and associated circuits to the manifold of a central station to the manifold of a junction.
Figure 7:
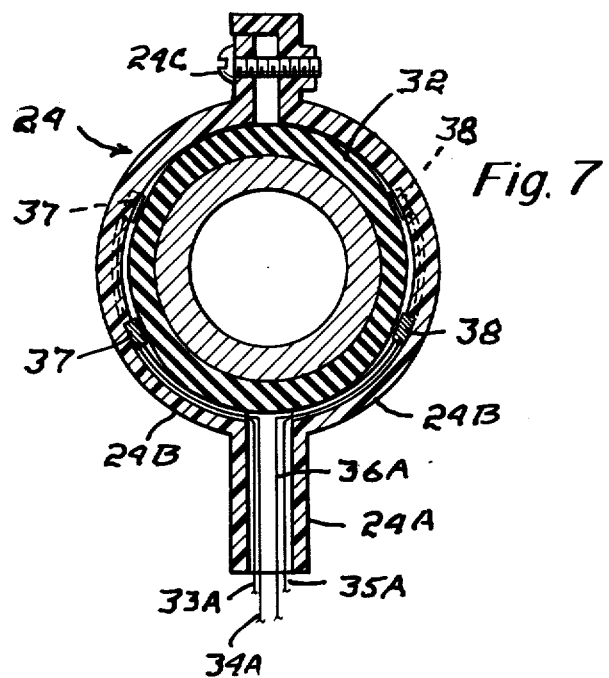
FIG. 7 is a section taken approximately along the indicated line 7—7 of FIG. 6.

Each connector 24, see FIGS. 6 and 7, includes a channel 24A and two sections 24B shaped and dimensioned to enclose an end of the hose 32 and with their free ends flanged and locked together by screws 24C. The channel 24A receives the wires 33A and 34A and 35A and 36A to and from the appropriate bus bars at the central station 19 or at a junction 29, and the wires 33A and 34A extend upwardly into one section 24B and are there provided with contacts 37 spaced from each other to engage the appropriate printed leads of the hose 32. Similarly, the wires 35A and 36A to and from the appropriate bus bars at the central station 19 or at a junction 29 extend upwardly into the other connector section 24B and are there provided with contacts 38 spaced from each other to engage the appropriate printed leads of the hose 32. The contacts 37 and 38 may be of an insulation piercing type.

Turning now to the probes 18, see FIGS. 2 and 2A, each probe is tubular and includes a disc 39 to limit the extent to which it may be inserted in the soil, a spray device 11 having a fitting 40 to which an end of the conduit 12, desirably a length of hose, is secured by a connector 13 and the hose includes leads 41 and 42 printed thereon and covered with insulation. The contact 16 is in the form of a point closing the soil-entering end of the probe and has a lead 43 connected thereto while the contact 17 is a band encircling the probe below its disc 39 and provided with a lead 44, the leads 43 and 44 within the probe.

Each connector 13 is generally similar to the connector 24 as each has a channel 13A and side section 13B shaped and dimensioned to enclose an end of the hose with their flange free ends locked together by screws 13C. The lead 43 extends into the channel 13A and upwardly into one side section 13B and the lead 44 also extends into the channel 13A and upwardly into the other side section 13. Both leads are provided with contacts 45 within the side section 13B, each for engagement with the appropriate one of the leads 41 and 42 and the contacts 45 may be of an insulation piercing type.

The connector 13 securing the other end of the hose 12 to an outlet 14 is or may be identical except that it contains the leads 46 and 47 of the control 10 which are, accordingly, connected to the contacts 15 and 16, respectively.

Each control unit 10, see FIG. 4, includes a voltage divider string in a 15 V input lead 48 to which the leads 46 and 47 are connected across a capacitor 49. The voltage divider string includes an adjustable resistor 50, establishing the output at the dry threshold, an adjustable resistor 51 between resistors 52 and 53 and establishing the output at the wet threshold with the values of the resistors determining the wanted limits to variations in the moisture content of the soil in the area in which a probe 18 is inserted.

The output circuit from the dry threshold resistor 50 includes a chain consisting of amplifiers 54 and 55 and their associated resistors 56 and 57. The output from the wet threshold resistor 51 includes a like amplifier chain having amplifiers 58 and 59 and associated resistors 60 and 61. Each amplifier chain provided unity gain and a shaped pulse output to an inverter stage that is used as a Schmitt trigger to open the associated valve 15, in the case of the dry threshold circuit, and close that valve, in the case of the wet threshold circuit. The inverter stage for the dry threshold chain has a ground connection 62 and inbetween a capacitor 63 and the amplifier 64 and includes a resistor 65. The inverter stage for the wet threshold chain has a 15 V input lead 66 between a capacitor 67 and an amplifier 68 and also includes a resistor 69. The resistors 65 and 69 are desirably but not necessarily adjustable.

Each valve 15 is opened and closed by a pulse operated solenoid 70 in a 15 V lead 71 provided with a resistor 72, a Zener diode 73, and a ground lead 74 having a resistor 75. The output of the amplifier 64 is operable through a resistor 76 to turn on the transistor 77 in a 15 V lead 78 and connected through a resistor 79 to the lead 71 between the Zener diode 73 and the resistor 75 as is the lead 80 which is also provided with a resistor 81 and a transistor 82. The transistor 82 is turned on by the output of the amplifier 68 through the Zener diode 83 and the resistor 84. While the pulses by which the solenoids 70 are operated are of opposite polarity, a feature not necessary for their operation but preferred in order to permit the circuitry to be used when operation does depend on pulses of opposite polarity.

Each valve 15, see FIG. 3, is of a type that is either opened or closed on each 90° turn of its valve element 15A relative to its valve body 15B thus to enable it to be operable by a pawl and ratchet connection with the solenoid 70. To that end, the stem 85 of each valve element 15A is provided with a disc 86 having four pins 87 spaced 90° apart and serving as ratchet members. The plunger or stem 70A of each solenoid 70 is retracted when that solenoid is energized by a pulse and then returned to its extended position by means of its spring 88. The plunger 70A has a pawl 89 pivotally connected to its exposed end and backed by a leaf spring 90 holding the pawl 89, when the plunger 70A is extended, in a position to engage a pin 87 and turn the valve body 15B through 90° when the solenoid 70 is again energized, the pawl yielding to permit its passage beyond the next to be engaged pin 87.

While water is being delivered to an area, the pump 22 is operated on command from the associated control 10. This objective is attained by logic circuitry in control of the operation of the pump motor 27. The output of the amplifier 55 is employed as one control of the logic circuitry through a capacitor 91, a ground lead 92 having an adjustable resistor 93, gates 94 and 95, a capacitor 96, a 15 V lead 97 having a resistor 98 and gates 99 and 100, the gate 99 conducting by the pulse thus derived to opening the gate 100.

The 15 V lead 71 has a branch 71A connected through the gate 100 and a resistor 101 to a transistor 102 in control of a 15 V lead 103 by which the 100 V AC pump motor circuit 104 is controlled. The lead 103 includes associated resistors 105 and 106 and is joined with like leads in the station 19 to include, see FIG. 5, a Zener diode 107 providing a 2.5 voltage to turn on the LED 108 to show that the pump is operating and to bias the triac switch 109 into conduction thereby to close the pump motor circuit 104. A snubber network across the triac switch 109 consists of a capacitor 110 and a resistor 111 to compensate for the current lag caused by the inductive load of the motor. When the gate 100 is opened, the gate 99 is held open until the output of the amplifier 68 turns on the transistor 82 thereby to provide for the pump motor 27 being stopped when a valve 15 is closed, unless a moisture demand is still detected at other areas.

The motor circuit 104, see FIG. 5, also includes additional control means with a lead 104A having a pressure operated switch 112 that monitors the back pressure at the water source and opens, if the pressure therein drops below a predetermined, pre-set threshold which, in practice corresponds to that which prevails when all the valves are open, a pressure condition which would occur if a hose ruptured. A time delay switch 113 which shorts out the switch 112 for a period such that, when the switch 112 is first closed, the pressure in the system can build up to the pre-set threshold. A circuit breaker 114 not only protects the system but also provides a means for turning the system completely off.

The lead 104A includes a fail-safe relay 115 the switch of which is of the double-throw, double-pole type. The set of relay contacts 115A, which are normally open, are in a holding lead 116, once the starting switch 117 is closed. The normally open contacts 115B complete the circuit to the motor 27 and the triac switch 109 and the normally closed contacts 115C are in a lead 118, shown as including a generally indicated audible alarm 119, a resistor 120, and a warning light 121. A switch 122, normally closed, provides a test function for the system.

Figure 5:
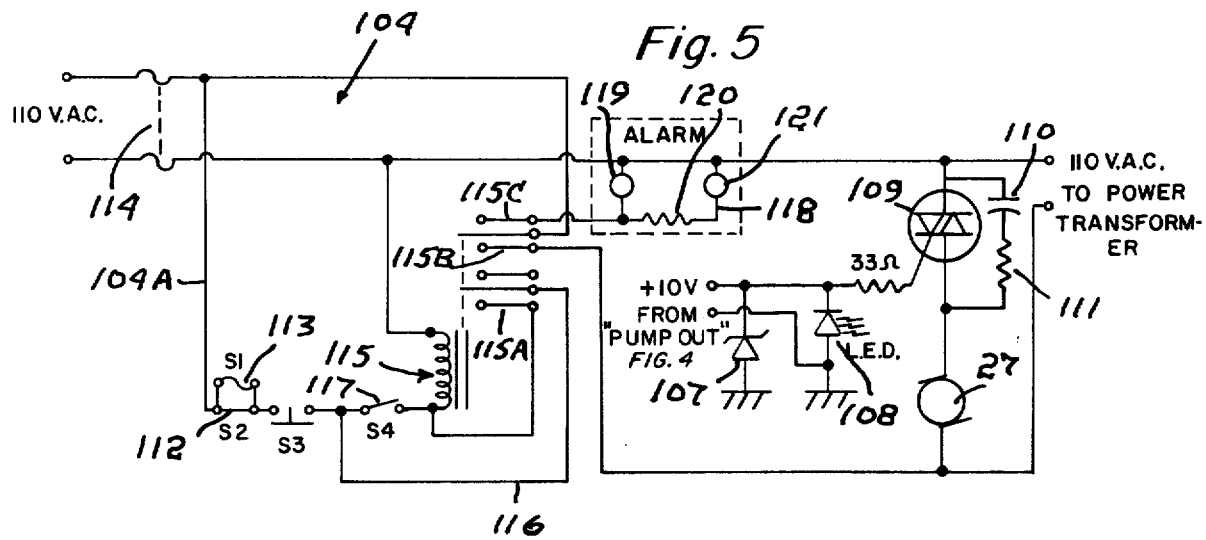
FIG. 5 is a schematic view of the pump motor circuit and that part of the circuitry by which that circuit is opened and closed.
Figure 8:
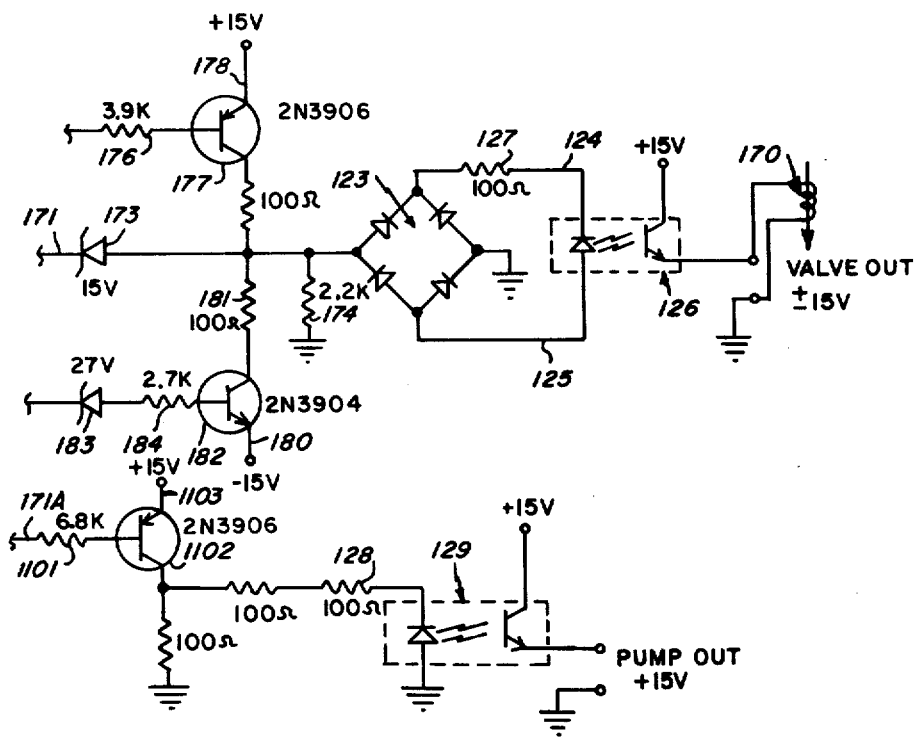
FIG. 8 is a view of a section of bi-state valve and pump operating circuitry for use with the tri-state logic output of FIG. 4.
Figure 9:
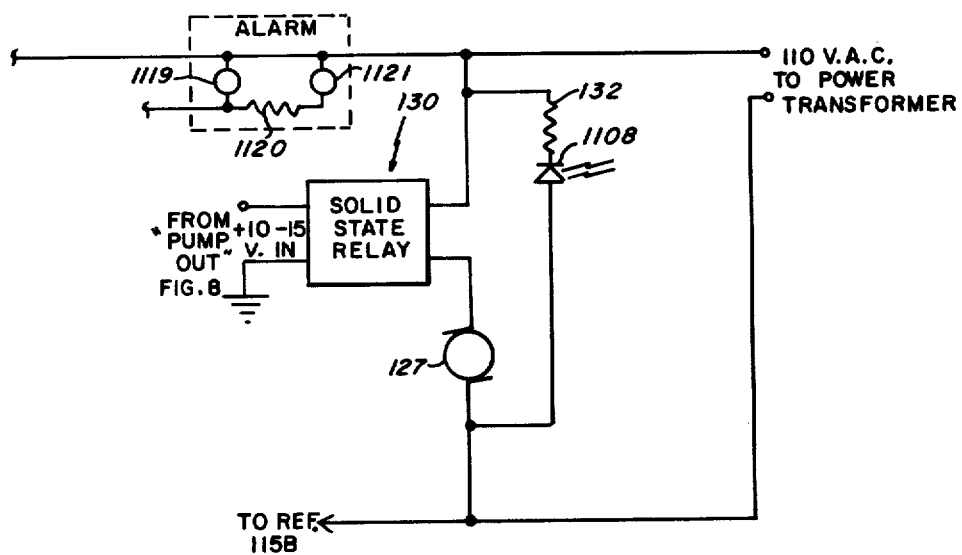
FIG. 9 is a view showing a modification of the pump motor circuit providing for noise suppression.

Reference is now made to FIGS. 8 and 9 wherein the circuitry of FIGS. 4 and 5 is changed in order to provide that the valve operating output is bi-state rather than tri-state and that valve operation and pump control may be free of objectionable noise transients. Only those sections of the circuitry of FIGS. 4 and 5 are shown to which the circuitry providing the above advantages is related. Corresponding parts are identified by the same reference numerals which are distinguished by the prefix addition of the numeral 1.

In FIG. 8, the lead 171 in which a pulse operated solenoid 170 is included also includes between the valve and the junction of the leads 178 and 180 a bridge rectifier 123 having leads 124 and 125 connected to an optical isolator 126. The lead 123 is provided with a resistor 127. The lead 1103 has a second resistor 128 and an optical isolator 129.

In FIG. 9, the "pump out" output when the transistor 1102 is turned on operates a conventional solid state relay 130 by which the motor 127 is controlled. A lead 131 bypassing the relay 130 and the motor 127 includes a voltage dropping resistor 132 and a LED 1108.

From the foregoing, it will be apparent that whenever the moisture in the soil in an area being monitored by a probe 10 reaches a predetermined low level, the pulse output of the low level threshold circuit is such as to cause the associated valve 15 to open and the logic circuitry to effect the operation of the pump motor. When the moisture content in that area reaches a predetermined high level, the output of the high threshold circuit effects the closing of the associated valve 15 to cause the logic circuitry to function to effect the opening of the pump motor circuit 104.

It will thus be apparent that the invention provides a multiple purpose irrigation system adapted to control existing irrigation systems for greater versatility and increased economy of water and electricity use as well as serving to operate its own pumping system, valves and hoses as a self-contained system again providing maximum economy in the use of water and electricity.

We claim:

1. A moisture sensing control for a valve in a conduit by which the soil in an area is watered, said control including a pair of contacts to be inserted in the soil, first and second circuits, and input leads, one lead including a voltage divider, said voltage divider comprising a resistor string and a capacitor, leads of substantial length connecting said contacts to said one input lead across the capacitor, said string including first and second adjustable resistors, the first establishing a dry threshold and providing an input for the first circuit and the second establishing a wet threshold and an input for the second circuit, each circuit including a Schmitt trigger and means operable in response to the threshold that circuit monitors to deliver shaped pulses to the associated trigger, and a third circuit including means operable to effect the opening and closing of said valve and means connected to each trigger to respond to the output thereof, that of the first circuit trigger to effect valve opening and that of the second circuit trigger to effect valve closing.

2. The control of claim 1 and a tubular probe of a material that is a non-conductor of electricity, a hose, said probe including a disc to limit the extent to which the probe can be inserted in the soil, a connector connecting the hose to the probe above the disc and said pair of contacts exposed on the exterior of the probe and vertically spaced from each other, each probe 360° in extent and of substantial area and each of said contact leads includes a portion electrically connected to the appropriate one of said contacts and a portion above said disc and attached to the connector.

3. The control of claim 2 in which the probe includes a spray head above the disc and means detachably attaching the conduit thereto.

4. The control of claim 2 in which the conduit is a length of hose and the contact leads include insulated portions extending along said hose and secured thereto, the probe includes a spray head above the disc, a hose-receiving barb at the inlet end of the spray head and a clamp locking a hose end to said barb, said clamp includes contacts engageable with said lead portions carried by the hose, each portion of the contact leads that extends from the probe within the clamp and connected to the appropriate one of said clamp contacts.

5. The control of claim 4 in which the contact leads extending lengthwise of the bore are printed thereon and insulation covers said printed leads.

6. The control of claim 1 in which one contact is a point closing the ground entering end of the probe and the other is a band encircling the probe between the point and said disc.

7. The control of claim 1 in which the third circuit includes an input lead provided with two transistors, one for each trigger and turned on by the output thereof.

8. The control of claim 7 in which a Zener diode is between the trigger of the second circuit and transistor turned on by the output thereof.

9. The control of claim 7 in which the output of each trigger is of a polarity opposite to that of the other.

10. The control of claim 1 in which the valve is of the rotary type and pawl and ratchet means turn it one-quarter turn each time the pawl and ratchet means is operated, the means by which the valve is opened and closed is a solenoid the stem of which is connected to said pawl and ratchet means to effect the operation thereof from an inoperative position in a valve turning direction, spring means to restore said stem to the inoperative position thereof, the input to the solenoid includes first and second transistors, one for each trigger and turned on by the output thereof, the output of each trigger in the form of a pulse effective to drive said stem against the resistance of said spring means to turn said valve a quarter turn.

11. The apparatus of claim 1 in which the third circuit also includes a bridge rectifier and an optical isolator.

12. Irrigation apparatus for an area, said apparatus including a water supply, a pump in control thereof and including a motor and a motor circuit, a conduit in communication with said area and with said supply, each conduit including a valve, and a control for said valve and said pump including a pair of contacts to be inserted in the soil, first and second circuits and input leads, one input lead including a resistor string and a capacitor, leads of substantial length connecting said contacts to said one input lead across said capacitor, said string including first and second adjustable resistors, the first establishing a dry threshold and providing an input for the first circuit and the second establishing a wet threshold and an input for the second circuit, each circuit including a Schmitt trigger and means operable in response to the monitored threshold to deliver shaped pulses thereto, a third circuit includes means operable to effect the opening and closing of said valve and means connected to each trigger to respond to the output thereof, and circuitry including a switch in said pump motor circuit and means connected to and controlled by the first circuit to effect the closing of said switch at the monitored threshold and means connected to said third circuit and controlled by the output of the second circuit trigger to effect the opening of said switch at the monitored threshold.

13. The apparatus of claim 12 in which the circuitry in control of the pump motor includes a fourth circuit including means operating the switch in the pump motor circuit and a transistor, and a fifth circuit in control of said fourth circuit transistor including the means connected to the first circuit that are operable to close the fifth circuit and the means connected to the third circuit that are operable to effect the opening of said fifth circuit.

14. The apparatus of claim 13 in which the means connecting the first and fifth circuits includes a pair of gates and a holding connection between said gates and the means connecting the third and fifth circuits includes a Zener diode and the collector of the transistor responding to the output of the second circuit trigger.

15. The apparatus of claim 13 in which the fourth circuit includes a light emitting diode and the switch is a triac.

16. The apparatus of claim 13 in which the fourth circuit has parallel leads of which one includes the switch and the pump motor and the switch is a solid state relay and the other lead includes a voltage dropping resistor and a light emitting diode.

17. The apparatus of claim 13 in which the fourth circuit includes an optical isolator.

18. The apparatus of claim 12 in which the pump motor circuit includes a relay of the type having three pairs of contacts, three leads, each including a contact of an appropriate one of said pairs, one lead a holding lead for the relay and normally open, a second including said motor and normally open, and a third including an alarm and normally closed, and a normally open switch in control of said relay and responsive to the water pressure at said supply to close when the pressure on the water is at a predetermined level.

19. The apparatus of claim 18 and a normally closed time delay switch in control of the relay operable and in parallel with the pressure responsive switch.

* * * * *